US011258350B2

(12) United States Patent
Jones et al.

(10) Patent No.: US 11,258,350 B2
(45) Date of Patent: Feb. 22, 2022

(54) GROUNDING ARRANGEMENT FOR A VOLTAGE SOURCE CONVERTER

(71) Applicant: GENERAL ELECTRIC TECHNOLOGY GMBH, Baden (CH)

(72) Inventors: Phillip Stephen Jones, Stafford (GB); Michael Evans, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/493,538

(22) PCT Filed: Mar. 6, 2018

(86) PCT No.: PCT/EP2018/055496
§ 371 (c)(1),
(2) Date: Sep. 12, 2019

(87) PCT Pub. No.: WO2018/166846
PCT Pub. Date: Sep. 20, 2018

(65) Prior Publication Data
US 2020/0007029 A1   Jan. 2, 2020

(30) Foreign Application Priority Data

Mar. 13, 2017   (GB) ..................................... 1703976

(51) Int. Cl.
*H02M 1/32*      (2007.01)
*H02J 3/36*      (2006.01)
*H02M 7/483*     (2007.01)

(52) U.S. Cl.
CPC ................. *H02M 1/32* (2013.01); *H02J 3/36* (2013.01); *H02M 7/483* (2013.01); *H02M 1/322* (2021.05); *H02M 7/4835* (2021.05)

(58) Field of Classification Search
None
See application file for complete search history.

(56) References Cited

U.S. PATENT DOCUMENTS

| | | | | |
|---|---|---|---|---|
| 4,202,591 A | * | 5/1980 | Borgstrom | ........... H02B 13/075 439/185 |
| 2013/0322131 A1 | * | 12/2013 | Sun | ........................ H02J 3/36 363/35 |

(Continued)

FOREIGN PATENT DOCUMENTS

| CN | 105896477 A | 8/2016 |
|---|---|---|
| EP | 2102953 B1 | 3/2014 |
| WO | 2015/172827 A1 | 11/2015 |

OTHER PUBLICATIONS

International Search Report of PCT/EP2018/055496 dated May 23, 2018.

(Continued)

*Primary Examiner* — Jeffrey A Gblende
(74) *Attorney, Agent, or Firm* — Eversheds Sutherland (US) LLP

(57) ABSTRACT

A grounding arrangement for a Voltage Source Converter (VSC) in a power transmission system is provided. The VSC comprises at least one converter branch (20) comprising at least one module ($22_1$-$22_N$), each module comprising a plurality of serially connected sub-modules ($24_1$-$24_8$) that can be controllably switched to generate a controlled voltage across the module ($22_1$-$22_N$) and each module including a first sub-module ($24_1$) at one end thereof and a last sub-module ($24_8$) at an opposite end thereof. Each sub-module ($24_1$-$24_8$) includes a first terminal ($38_1$), a second terminal ($38_2$), an energy storage element (30) and a switching arrangement (32, 34), wherein at least one of the first ($38_1$) or second terminals ($38_2$) is coupled to a terminal of the energy storage unit (30). A first terminal ($38_1$) of the first sub-module ($24_1$) of a module ($22_1$) at one end of the converter branch (20) is configured to be connected to earth potential on or after shutdown of the converter, and a second terminal ($38_2$) of the last sub-module ($24_8$) of the module (Continued)

(22N) at the opposite end of the converter branch (20) is configured to be connected to earth potential on or after shutdown of the converter. A grounding arrangement (40) comprising a plurality of switch units (42) is provided, each switch unit (42) associated with one of the plurality of sub-modules ($24_1$-$24_8$) of each module ($22_1$-$22_N$) and configured to connect the first ($38_1$) and second ($38_2$) terminals of the associated sub-module ($24_1$-$24_8$) on remote activation of the grounding arrangement (40), following connection to earth potential of the first ($24_1$) and last sub-modules ($24_8$) of the converter branch (20).

16 Claims, 6 Drawing Sheets

(56) References Cited

U.S. PATENT DOCUMENTS

| | | | |
|---|---|---|---|
| 2016/0278192 A1* | 9/2016 | Sandin | H02H 9/02 |
| 2017/0054229 A1* | 2/2017 | Dore | H01H 31/32 |

OTHER PUBLICATIONS

Great Britain Search Report for Application No. 1703976.9 dated Sep. 11, 2017.

* cited by examiner

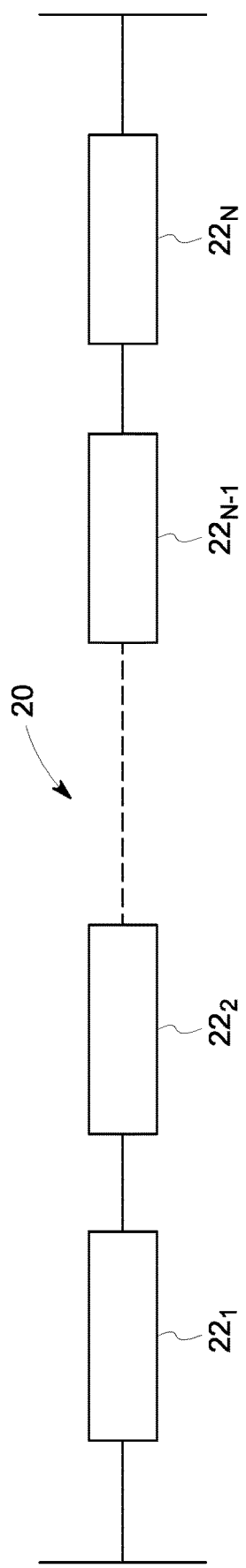

GROUNDING ARRANGEMENT FOR A VOLTAGE SOURCE CONVERTER

CROSS-REFERENCE TO RELATED APPLICATIONS

This application is a U.S. National Stage Application under 35 U.S.C. 371 and claims the priority benefit of International Application No. PCT/EP2018/055496 filed Mar. 6, 2018, which claims priority to EP1703976.9, filed Mar. 13, 2017, which are both incorporated herein by reference.

This application relates to HVDC transmission systems, and in particular, to a method of earthing the valves of voltage source converter, and a voltage source converter for use in high voltage power transmission.

BACKGROUND OF THE INVENTION

In HVDC power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance. The conversion of AC to DC power is also utilized in power transmission networks where it is necessary to interconnect AC networks operating at different frequencies. In any such power transmission network, converters are required at each interface between AC and DC power to effect the required conversion.

In the past, most HVDC transmission systems have been based on line commutated converters (LCCs), for example such as a six-pulse bridge converter using thyristor valves. More recently, voltage source converters (VSCs) are proposed for use in HVDC transmission. VSCs use switching elements such as insulated-gate bipolar transistors (IGBTs) that can be controllably turned on and off independently of any connected AC system. VSCs are thus sometime referred to as self-commutating converters.

In a particular type of VSC, known as a modular multi-level converter (MMC) having a plurality of converter branches, commonly known as valves, comprising one or more modules connected in series, are typically connected in wye/star, delta, and/or bridge configurations. Each module further comprises a plurality of sub-modules connected in series, with each sub-module of a converter branch comprising an energy storage element, such as a capacitor, and a switching arrangement comprising insulated gate bipolar transistor (IGBT) devices, integrated gate-commutated thyristor (IGCT) devices, gate-turn-off thyristor (GTO) devices, or MOSFETs. The switching arrangement can be controlled to either connect the energy storage element between the terminals of the sub-module, or bypass the energy storage element. The sub-modules are controlled to connect or bypass their respective energy storage elements at different times, so as to vary the voltage difference across the plurality of sub-modules over time.

By using a relatively large number of sub-modules and timing the switching appropriately, the converter branch can synthesise a stepped waveform that approximates to a desired waveform, such as a sine wave, to convert from DC to AC or vice versa with low levels of harmonic distortion. The use of converter branches including a plurality of individual modules and sub-modules allows different levels of voltage to be constructed. For example, depending on the specifications of a particular VSC, the voltage per sub-module capacitor may typically be of the order of 1 to 6 kV, while the voltage of a converter branch may be in a range from 10 to several 100 kV. High voltage levels in power transmission can therefore be accommodated by increasing the number of modules in the converter branch.

Sometimes, due to a fault, maintenance or otherwise, it may become necessary to shut down a VSC within a transmission system. In such circumstances, there exists a small possibility that the capacitor of one or more individual sub-modules may fail to discharge completely after shutdown, so that some voltage may remain on the converter branch. This may arise, for example, due to a failure of an internal discharge circuit typically associated with each module or sub-module (of the converter. Because a converter branch typically may comprise the serial connection of multiple modules and sub-modules, in a worst case scenario, the voltages remaining on individual sub-modules may can 'add' up along the converter branch to a larger voltage. Although such a situation is extremely rare, the potential risks for maintenance personnel accessing the valves of the converter after shutdown may be catastrophic and it is critical that provision for such scenarios is provided. For this reason, a reliable grounding arrangement for the converter branch is required to allow safe access for maintenance personnel.

It is apparent that in order to allow safe access for maintenance teams to the converter following shutdown, it is necessary to define the maximum voltage level that may exist in the converter branch at any time. As described above, in typical VSCs, the voltage per sub-module capacitor may be in the range of 1 to 6 kV, while the total voltage of a converter branch may be in a range from 10 to several 100 kV. However, as will be appreciated, the indeterminate nature of any failure of capacitor discharge within individual sub-modules makes it extremely difficult to define a fixed voltage for the converter branch to be taken into consideration in providing an appropriate solution for such scenarios.

EP 2102953 describes a grounding arrangement suitable for use in MMC converters which comprises a conveyor belt arranged to move in a longitudinal direction, positioned proximate to the housings associated with the sub-modules of a converter branch. The belt comprises a conductive section connected to a grounding point and an insulating section remote from the grounding point. During normal operation of the converter, the belt is positioned so that the insulating section thereof is arranged adjacent the housings of the sub-modules. When grounding of the converter branch is required, the belt is activated to move the conductive section adjacent to the sub-modules, and sliding contacts fitted to the housings of the sub-modules are brought into contact with the belt to achieve grounding of the sub-module housings.

The equipment involved in such a grounding arrangement for each converter branch is complex and bulky, requiring significant valuable footprint within the valve halls of a converter. Moreover, to maintenance personnel accessing the converter after shutdown, it may not be readily visible that the conductive section of the belt is in contact with the sub-module housings so there is still a risk in the event that the mechanism has not operated properly. Moreover, such a grounding arrangement is not scalable, in that if further sub-modules are to be added to the converter branch, replacement of the existing belt with a longer one having appropriate conductive and insulating sections will be necessary.

The present invention seeks provide a grounding arrangement suitable for use in MMC converters that alleviates at least some of the issues described above.

BRIEF DESCRIPTION OF THE INVENTION

The present invention resides in a Voltage Source Converter (VSC) for use in a power transmission system, the VSC comprising at least one converter branch comprising one or more serially connected modules, each module comprising a plurality of serially connected sub-modules that can be controllably switched to generate a controlled voltage across the module and each module including a first sub-module at one end thereof and a last sub-module at an opposite end thereof. Each sub-module includes a first terminal, a second terminal, an energy storage element and a switching arrangement, wherein one of the first or second terminals is coupled to a terminal of the energy storage unit. A first terminal of the first sub-module of a module at one end of the converter branch is configured to be connected to earth potential on or after shutdown of the converter, and a second terminal of the last sub-module of the module at the opposite end of the converter branch is configured to be connected to earth potential on or after shutdown of the converter. A grounding arrangement comprising a plurality of switch units is provided, wherein at least one of each of the plurality of switch units is associated with at least one of each of the plurality of sub-modules of each module, and is configured to connect the first and second terminals of the associated sub-module on remote activation of the grounding arrangement, following the connection to earth potential of the first and last sub-modules of the converter branch.

In one preferred embodiment, there is one switch unit associated with each one of the plurality of sub-modules. Preferably, the switch unit is an integrated component of the associated sub-module.

In another embodiment, one switch unit is associated with two or more of the plurality of sub-modules.

In a preferred embodiment of the present invention, at least one of the plurality of switch units comprises a mechanical switching device. The mechanical switching device preferably comprise one of a hinged switch mechanism, a sliding switch mechanism or resilient type switch mechanism.

In an alternative embodiment, at least one of the plurality of switching units comprises one of an electrical or electronic switching device.

The grounding arrangement is configured to be activated automatically or manually. In one preferred embodiment, the grounding arrangement is activated by an arrangement of insulating rods pulled from ground level via a mechanism actuated manually from inside the valve hall of the converter. In an alternative embodiment, the grounding arrangement is activated by an arrangement of insulating rods pulled from ground level via a motorized, hydraulic or pneumatic actuator commanded manually or automatically from outside the valve hall of the converter.

In one embodiment of the present invention, the connection to earth potential of the first and last sub-modules of the converter branch may occur automatically on shutdown of the converter. In an alternative embodiment, the connection to earth potential of the first and last sub-modules of the converter branch is performed manually after shutdown of the converter.

In an alternative embodiment of the present invention, the first terminal of the first sub-module and the second terminal of the last sub-module of each individual module of the converter branch are connected to earth potential on or after shutdown of the converter.

The energy storage unit of each sub-module preferably comprises a capacitor.

In various embodiments of the present invention, the voltage source converter comprises one of Modular Multilevel Converter (MMC), Alternate-Arm-Converter (AAC), or Series Bridge Converter (SBC).

In a further aspect, the present invention resides in a method of grounding a converter branch of a Voltage Source Converter, including at least one converter branch comprising one or more serially connected modules, each module comprising a plurality of serially connected sub-modules that can be controllably switched to generate a controlled voltage across the module, Each module includes a first sub-module at one end thereof and a last sub-module at an opposite end thereof and each sub-module includes a first terminal, a second terminal, an energy storage element and a switching arrangement, wherein at least one of the first or second terminals is coupled to a terminal of the energy storage unit. The method comprises connecting a first terminal of the first sub-module of a module at one end of the converter branch to earth potential and a second terminal of the last sub-module of the module at the opposite end of the converter branch to earth potential on or after shutdown of the converter. Subsequent to connection to earth potential of the first and last sub-modules of the converter branch, the method further comprises remotely activating a plurality of switch units, at least one of each of the plurality of switch units being associated with at least one of each of the plurality of sub-modules of each module of the converter branch so to connect the first and second terminals of the associated sub-module.

BRIEF DESCRIPTION OF THE DRAWINGS

Embodiments of the present invention will now be described, by way of example only, with reference to the accompanying drawings, in which:

FIG. 2A is a diagrammatic representation of a converter branch of a MMC during normal operation of the converter according to an embodiment of the present invention

DETAILED DESCRIPTION OF THE INVENTION

In summary, the present invention seeks to provide a solution to the problems outlined above by bringing the sub-module at either end of the converter branch to earth potential and "shorting-out" each submodule between its terminals. This configuration removes the mechanism by which the voltage remaining within individual serially connected sub-modules of the modules of the converter arm due to capacitor discharge failure, to be combined, or "summed", potentially resulting in a much larger voltage. Therefore, it becomes possible to define a maximum voltage for the converter branch that may exist due to capacitor discharge failure within individual sub-modules of the converter branch modules following shutdown of the converter. This maximum voltage will be limited to the maximum voltage rating of the capacitor of an individual sub-module of the converter branch modules, typically of the order of 1 to 6 kV. As will be appreciated, limitation of the potential residual voltage on a converter branch after shutdown to the maximum voltage rating of the sub-module capacitor, greatly reduces the risks to which maintenance personnel may be exposed.

An embodiment of the invention is illustrated with reference to FIG. 2A. A converter branch 20, commonly referred to as a valve, is shown comprising N serially connected modules $22_1$-$22_N$, and including a first end module $22_1$ at one end 26 of the converter branch 20 and a second end module $22_N$ at the opposite end 28 of the converter branch 20. It should be understood that the number of modules N within the converter branch 20 may be a single module or any number of modules and will be determined based on the operational requirements of the converter 10 and the power transmission system.

Figure 1:
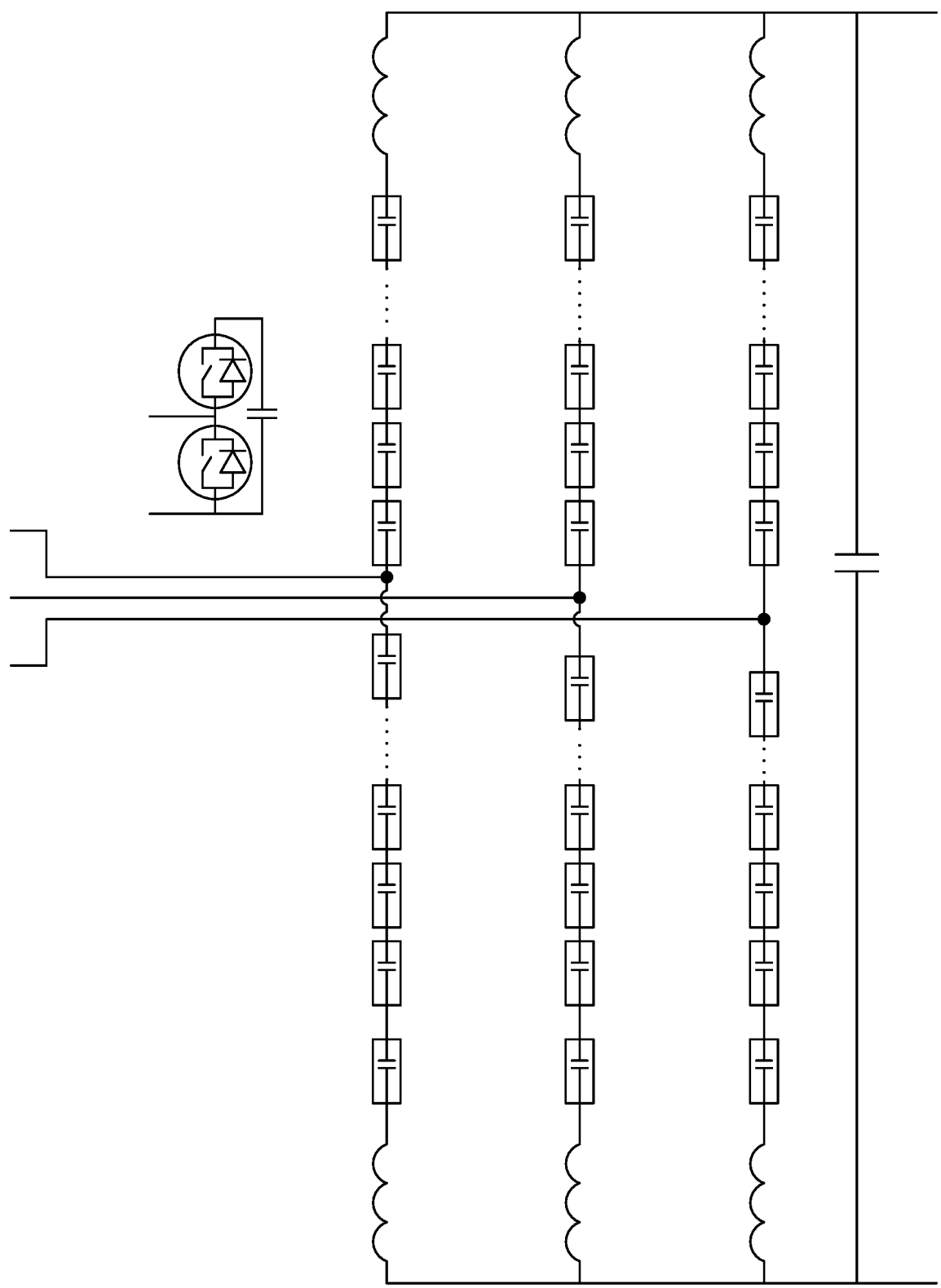
FIG. 1 is a block diagram representation of an example Modular Multilevel Converter (MMC)
Figure 2B:
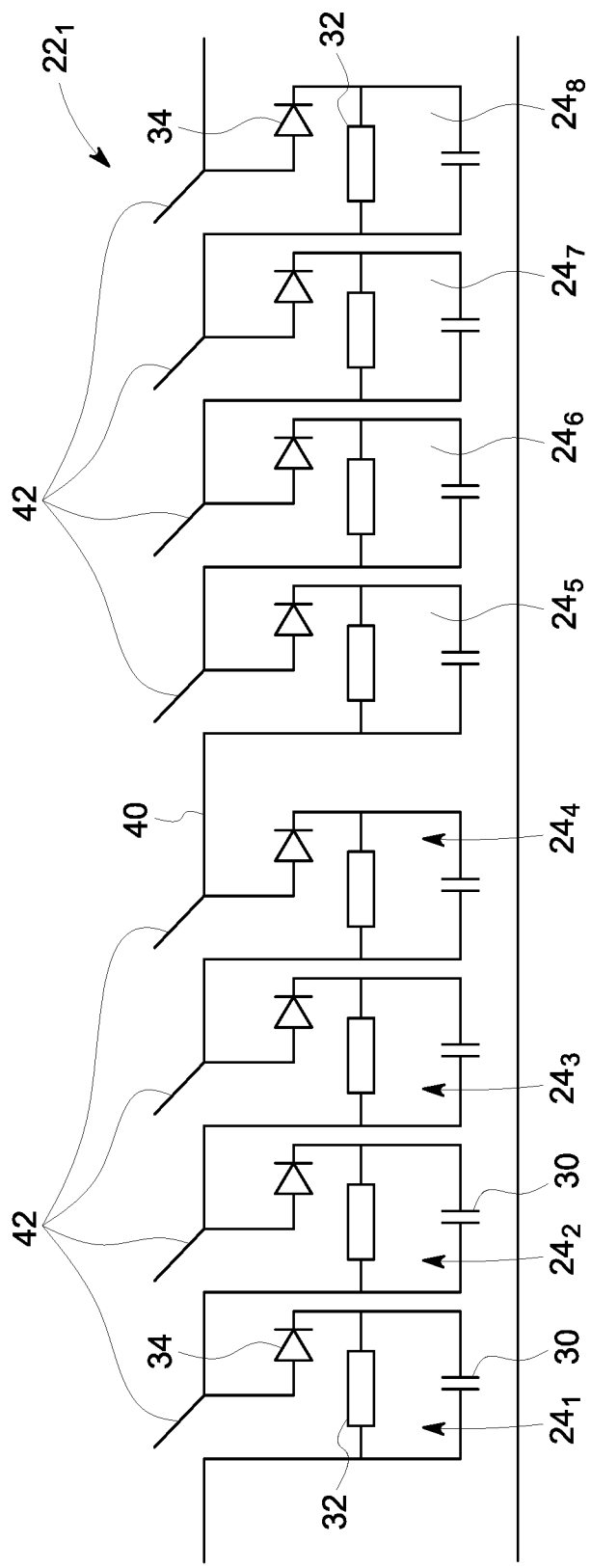
FIG. 2B is a diagrammatic representation of a module of the converter branch of FIG. 2A
Figure 2C:
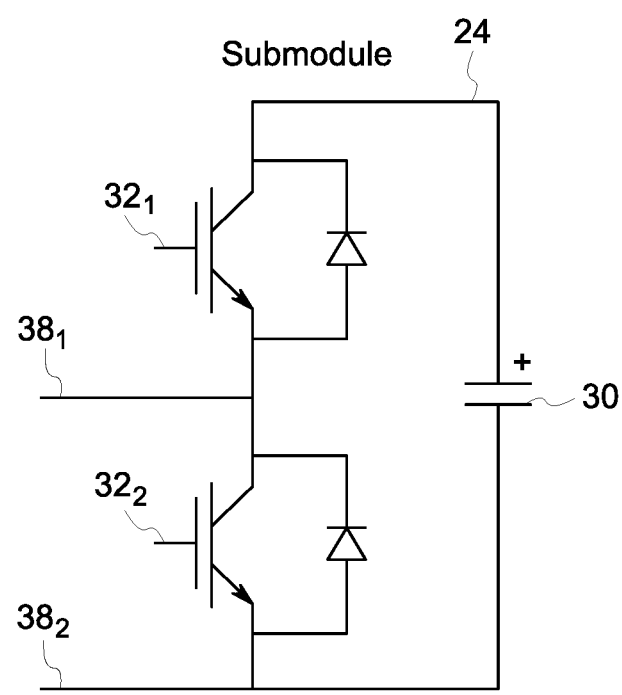
FIG. 2C is a representation of the structure of a sub-module of the module of FIG. 2B.

The configuration of the modules 22 of the converter arm 2 are in described in more detail with reference to FIGS. 2B and 2C. Each module 22 includes eight serially connected sub-modules $24_1$-$24_8$, including a first sub-module $24_1$ at one end thereof and a last sub-module $24_8$ at an opposite end thereof. As is well known in the art and illustrated in FIG. 2C, each sub-module $24_1$-$24_8$ comprises at least one capacitor unit 30 and at least first and second switches $32_1$ and $32_2$ in parallel with a respective anti-parallel diode. The switches $32_1$ and $32_2$ may typically be semiconductor switching elements such as IGBTs. The switches $32_1$ and $32_2$, are arranged such that the capacitor unit 30 may be connected between the terminals $38_1$ and $38_2$ of the sub-module 24, or bypassed, as required. Although eight sub-modules 24 are shown within each module 22, it should be appreciated that each module 22 may comprise any suitable number of sub-modules 24 depending on the specification of the converter. The sub-modules shown in FIG. 2C comprise a half-bridge switch arrangement but it will be appreciated by one skilled in the art that other arrangements, such as a full bridge switch arrangement may be used for at least some sub-modules.

Referring back to FIGS. 2A and 2B, the converter arm 20 also includes a grounding arrangement 40 comprising a plurality of switch units 42, each configured to connect across the terminals $38_1$ and $38_2$ of each sub-module 24 of each module 22 in the converter branch 20 when activated. In normal operation of the converter, the switch units 42 of each sub-module 24 of the converter branch 20 are not activated and remain in an "open" condition as shown in FIG. 2.

Figure 3:
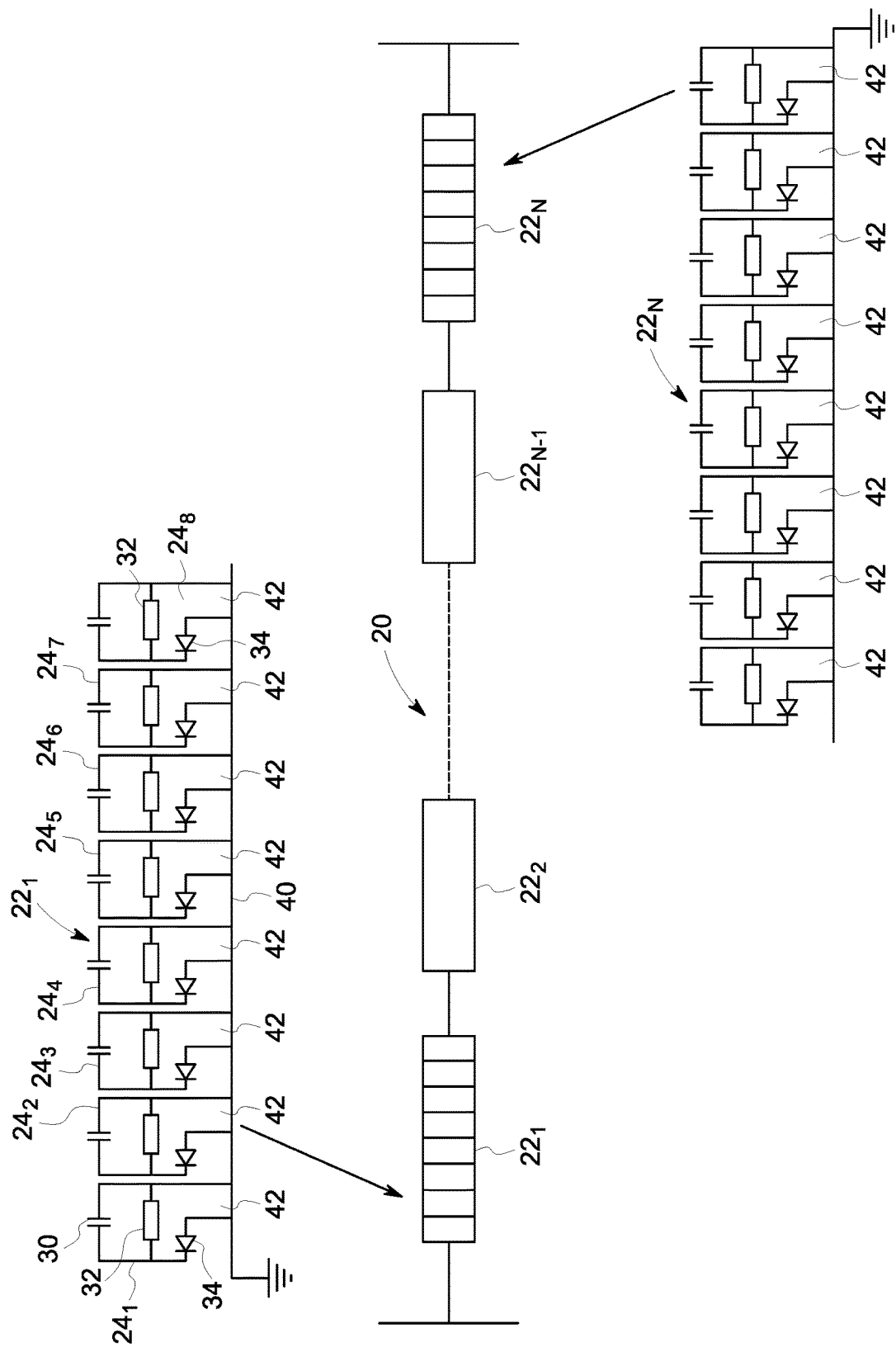
FIG. 3 is a diagrammatic representation of the converter branch of FIG. 2A after shutdown of the converter for maintenance.

FIG. 3 illustrates the converter branch 20 of FIG. 2A after shutdown of the converter 10. As shown in FIG. 3, a first terminal $38_1$ of the first sub-module $24_1$ of a module $22_1$ at a first end 26 of the converter branch 20 is connected to earth potential and a second terminal $38_2$ of the last sub-module $24_8$ of the module $22_N$ at the opposite end 28 of the converter branch 20 is connected to earth potential. It will be appreciated that where the converter arm 20 comprises a single module 22, the first and last sub-module thereof will be connected to earth. The connection to earth potential may be activated automatically on shutdown of the converter 10 or may be performed manually.

Subsequently to the connection to earth of the two sub-modules $24_1$ and $24_8$ at the extreme ends of the converter branch 20, the switch unit 42 across each sub-module $24_1$-$24_8$ of the converter branch modules $22_1$-$22_N$ is actuated to a "closed" position. In such a "closed" position, the terminals $38_1$ and $38_2$ of each sub-module $24_1$-$24_8$ of each module $22_1$-$22_N$ along the converter branch 20 is connected to earth potential. As a result, one terminal of the capacitor unit 30 of each sub-module $24_1$-$24_8$ will also be connected to earth potential. In this way, the maximum residual voltage on the converter branch 20 due to capacitor discharge failure in one or more of the individual sub-modules $24_1$-$24_8$ within the converter branch will be limited to the maximum voltage rating of an individual sub-module capacitor unit 30.

The switch unit 42 of each sub-module $24_1$-$24_8$ may comprise a mechanical switch, such as, for example, a hinged switch mechanism, a sliding switch mechanism, a resilient switch mechanism, such as a spring biased switch mechanism, or any other suitable switching mechanism. Alternatively, the switch unit 42 may comprise any appropriate electrical or electronic switching device.

The switch unit 42 of each sub-module $24_1$-$24_8$ may be actuated or triggered in any suitable way. For example, the mechanism for transmitting a trigger command to the individual sub-modules $24_1$-$24_8$ of the converter arm 20 may comprise an arrangement of insulating rods which can be pulled from ground level in some way. This could be achieved manually, via a handle, possibly actuated from inside the valve hall, or by means of a motorized, hydraulic or pneumatic actuator which, for safety reasons, could be commanded from outside the valve hall. Alternatively, the switch units 40 may be triggered automatically on shut down of the converter by a converter control unit.

Although the invention as described with reference to FIGS. 2 and 3 of the drawings comprise an individual switch unit 42 associated with each one of the plurality of sub-modules $24_1$-$24_8$, it should be understood that other configurations that achieve the same result are contemplated. For example, one switch unit 42 may be associated with two or more sub-modules $24_1$-$24_8$ or a single switch unit 42 may be associated with a single module of the converter arm. In instances where a single switch unit is provided for each sub-module 24, the switch unit may comprise an integrated component of the sub-module 24 at fabrication thereof. Alternatively, the switch units 42 of the grounding arrangement 40 may be retrofitted to existing sub-modules 24.

Figure 4:
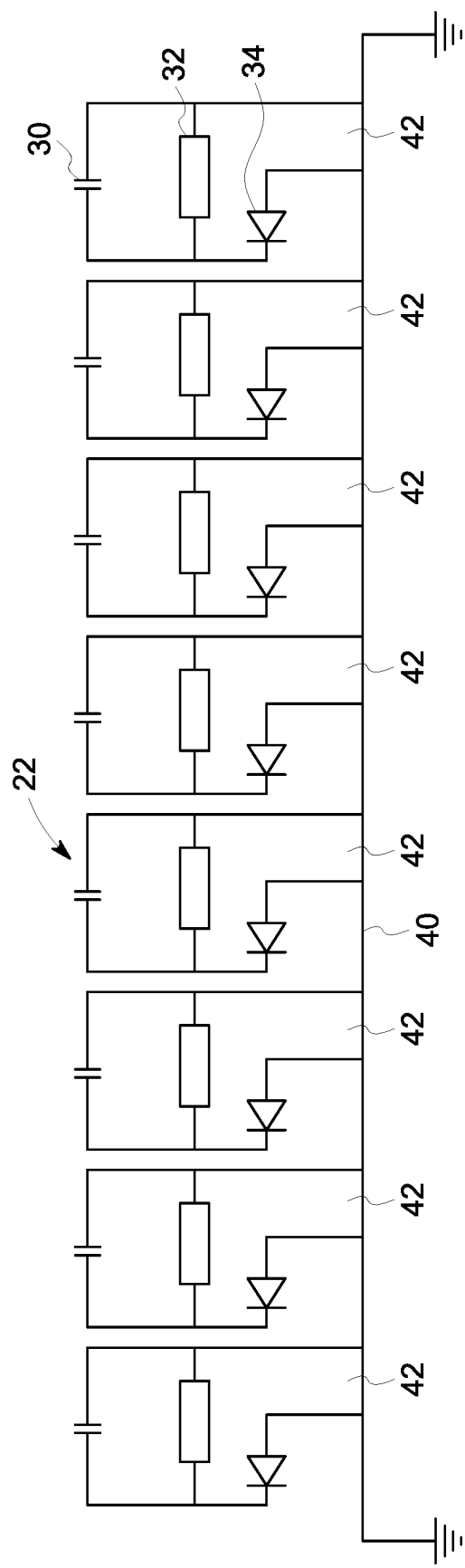
FIG. 4 is a diagrammatic representation of the converter branch of FIG. 2A after shutdown of the converter for maintenance, according to an alternative embodiment of the present invention.

In an alternative embodiment of the invention as illustrated in FIG. 4 of the drawings, the terminals of the first $24_1$ and last $24_N$ submodules of each individual module $22_1$-$22_N$ of the converter branch 20 may be connected to earth potential on or after shutdown of the converter. As described with reference to FIGS. 2 and 3 above, each sub-module $24_1$-$24_8$ of each individual module $22_1$-$22_N$ comprises an associated switch unit 42 that will be activated subsequent to earthing of the first $24_1$ and last $24_N$ submodules of each module $22_1$-$22_N$, so as to achieve connection to earth of the terminals $38_1$ and $38_2$ of each sub-module $24_1$-$24_8$ of each individual module.

As described above, one advantage of the present invention is that uncertainty surrounding the potential residual voltage on sub-modules of a converter branch is limited to the individual voltage rating of the capacitor units 30 of the sub-modules 24. Depending on these ratings, the intervention time before work on the converter can be safely carried out by maintenance personnel is greatly reduced.

In addition, the equipment involved in achieving the grounding arrangement for each converter branch is relatively simple and inexpensive to implement and does not require significant footprint. Moreover, particularly with use of mechanical type switch units, the working parts of the grounding arrangement are visible to maintenance personnel accessing the converter, so it is very clear whether grounding of each sub-module has been achieved. This further enhances safety and minimises risk for maintenance personnel. A further advantage is that the configuration is highly scalable, in that if further sub-modules are to be added to the converter branch, implementation of the grounding mechanism may be easily achieved.

The invention claimed is:

1. A voltage source converter (VSC) for use in a power transmission system, the VSC comprising:
   at least one converter branch comprising at least one module, each module comprising a plurality of serially connected sub-modules that can be controllably switched to generate a controlled voltage across the module and each module including a first sub-module at one end thereof and a last sub-module at an opposite end thereof;
   each sub-module including a first terminal, a second terminal, an energy storage element and a switching arrangement, wherein at least one of the first or second terminals is coupled to a terminal of the energy storage unit;
   wherein a first terminal of the first sub-module of a module at one end of the converter branch is configured to be connected to earth potential on or after shutdown of the converter, and a second terminal of the last sub-module of the module at the opposite end of the converter branch is configured to be connected to earth potential on or after shutdown of the converter; and
   a grounding arrangement comprising a plurality of switch units, wherein each of the plurality of switch units is associated with one of the plurality of sub-modules of each module, and is configured to connect the first and second terminals of the associated sub-module on remote activation of the grounding arrangement, subsequently to the connection to earth potential of the first and last sub-modules of the converter branch,
   wherein each of the plurality of switch units is an individual integrated component of the associated sub-module.

2. The voltage source converter of claim 1, wherein at least one of the plurality of switching units comprises one of an electrical or electronic switching device.

3. The voltage source converter of claim 1, wherein the grounding arrangement is configured to be activated automatically.

4. The voltage source converter of claim 1, wherein the grounding arrangement is configured to be activated manually.

5. The voltage source converter of claim 4, where the grounding arrangement is activated by an arrangement of insulating rods pulled from ground level via a mechanism actuated manually from inside a valve hall of the converter.

6. The voltage source converter of claim 3, where the grounding arrangement is activated by an arrangement of insulating rods pulled from ground level via a motorized, hydraulic or pneumatic actuator commanded manually or automatically from outside a valve hall of the converter.

7. The voltage source converter of claim 1, wherein the connection to earth potential of the first and last sub-modules of the converter branch is automatic on shutdown of the converter.

8. The voltage source converter of 1, wherein the connection to earth potential of the first and last sub-modules of the converter branch is performed manually after shutdown of the converter.

9. The voltage source converter of claim 1, the first terminal of the first sub-module and the second terminal of the last sub-module of each individual module of the converter branch are connected to earth potential on or after shutdown of the converter.

10. The voltage source converter of claim 1, wherein the energy storage unit comprises a capacitor.

11. The voltage source converter of claim 1, wherein the voltage source converter comprises one of Modular Multilevel Converter, MMC, Alternate-Arm-Converter, AAC, or Series Bridge Converter, SBC.

12. The voltage source converter of claim 11, wherein at least one of the plurality of switch units comprises a mechanical switching device.

13. The voltage source converter of claim 12, wherein the at least one of the plurality of switch units comprises a hinged switch mechanism.

14. The voltage source converter of claim 12, wherein the at least one of the plurality of switching units comprises a sliding switch mechanism.

15. The voltage source converter of claim 12, wherein the at least one of the plurality of switching units comprises a resilient type switch mechanism.

16. A method of grounding a converter branch of a voltage source converter (VSC), including at least one converter branch comprising at least one module, each module comprising a plurality of serially connected sub-modules that can be controllably switched to generate a controlled voltage across the module, each module including a first sub-module at one end thereof and a last sub-module at an opposite end thereof and each sub-module including a first terminal, a second terminal, an energy storage element and a switching arrangement, wherein at least one of the first or second terminals is coupled to a terminal of the energy storage unit, the method comprising
   connecting a first terminal of the first sub-module of a module at one end of the converter branch to earth potential and a second terminal of the last sub-module of the module at the opposite end of the converter branch to earth potential on or after shutdown of the converter; and
   subsequent to connection to earth potential of the first and last sub-modules of the converter branch, remotely activating a plurality of switch units, each of the plurality of switch units being associated with one of the plurality of sub-modules of each module of the converter branch so to connect the first and second terminals of the associated sub-module.

* * * * *